(12) United States Patent
Bae et al.

(10) Patent No.: US 11,689,792 B2
(45) Date of Patent: Jun. 27, 2023

(54) CAMERA MODULE MANUFACTURING APPARATUS, CAMERA MODULE, AND MANUFACTURING METHOD THEREOF

(71) Applicant: Furonteer Inc., Seongnam-si (KR)

(72) Inventors: Sang Shin Bae, Seoul (KR); Seong Min Yun, Hwaseong-si (KR); Jong Hyun Yim, Gumi-si (KR); Sung Hwan An, Seoul (KR)

(73) Assignee: FURONTEER INC., Seongnam-si (KR)

( * ) Notice: Subject to any disclaimer, the term of this patent is extended or adjusted under 35 U.S.C. 154(b) by 126 days.

(21) Appl. No.: 17/478,646

(22) Filed: Sep. 17, 2021

(65) Prior Publication Data

US 2022/0006932 A1    Jan. 6, 2022

Related U.S. Application Data

(63) Continuation-in-part of application No. 17/214,345, filed on Mar. 26, 2021, now Pat. No. 11,153,470.

(30) Foreign Application Priority Data

May 8, 2020   (KR) ............... 10-2020-0055361
Oct. 26, 2020  (KR) ............... 10-2020-0139655
Sep. 3, 2021   (KR) ............... 10-2021-0117661

(51) Int. Cl.
*H04N 23/55*    (2023.01)
*G02B 7/02*     (2021.01)
(Continued)

(52) U.S. Cl.
CPC ............ *H04N 23/55* (2023.01); *G02B 7/025* (2013.01); *H04N 23/54* (2023.01); *G02B 27/62* (2013.01)

(58) Field of Classification Search
CPC ................................................. H04N 23/55
(Continued)

(56) References Cited

U.S. PATENT DOCUMENTS

| 6,665,984 | B2 | 12/2003 | Craig et al. |
| 2011/0070811 | A1 | 3/2011 | Neuber et al. |
| 2020/0333618 | A1* | 10/2020 | Yamaguchi ............ G02B 7/025 |

FOREIGN PATENT DOCUMENTS

| JP | 2005-292242 A | 10/2005 |
| KR | 2016-0051955 A | 5/2016 |
| KR | 2018-0046925 A | 5/2018 |

OTHER PUBLICATIONS

Written Opinion dated Oct. 8, 2020 in related foreign application No. KR-10-2020-0055361, all pgs.
(Continued)

*Primary Examiner* — Joel W Fosselman
(74) *Attorney, Agent, or Firm* — Kilpatrick Townsend & Stockton LLP

(57) ABSTRACT

A camera module manufacturing apparatus includes: a chart unit configured to provide an image for optical-axis alignment to a substrate assembly including an image sensor; a substrate alignment unit disposed opposite to the chart unit, aligning the substrate assembly, and electrically connected to the image sensor; an optical axis alignment unit configured to allow an optical axis of a lens assembly including a lens and an actuator to be aligned with respect to an optical axis of the image sensor; and a camera module fixing unit positioned adjacent to the optical axis alignment unit, and fixing the lens assembly on the substrate assembly by applying an instantaneous curing adhesive, which is an inorganic material, to the lens assembly and the substrate assembly which are aligned.

20 Claims, 14 Drawing Sheets

(51) Int. Cl.
*H04N 23/54* (2023.01)
*G02B 27/62* (2006.01)

(58) Field of Classification Search
USPC .......................................................... 348/335
See application file for complete search history.

(56) References Cited

OTHER PUBLICATIONS

Non-Final Rejections dated Jul. 15, 2020 in related foreign application No. KR-10-2020-0055361, all pgs.
Written Decision on Registration dated Dec. 22, 2020 in related foreign application No. KR-10-2020-0055361, all pgs.
Written Opinion dated Apr. 8, 2021 in related foreign application No. KR-10-2020-0139655, all pgs.

\* cited by examiner

FIG. 2
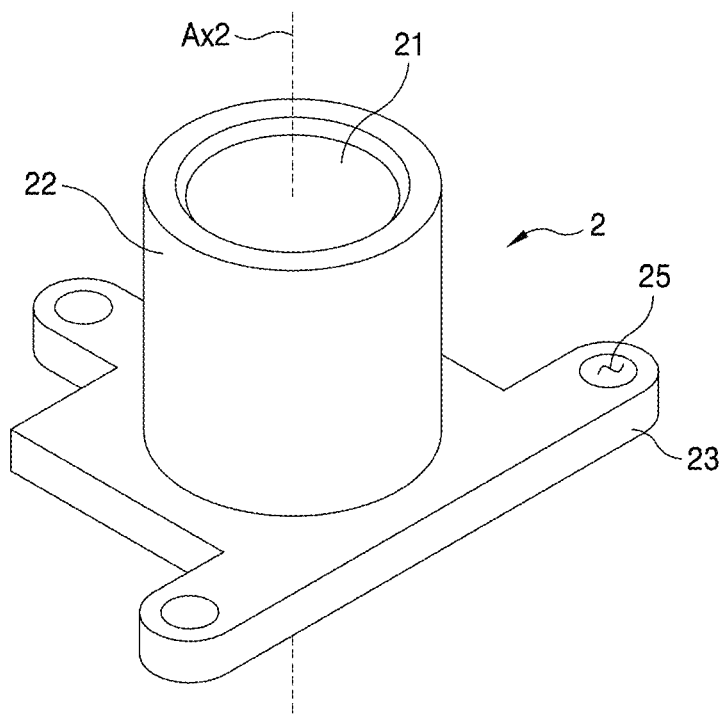
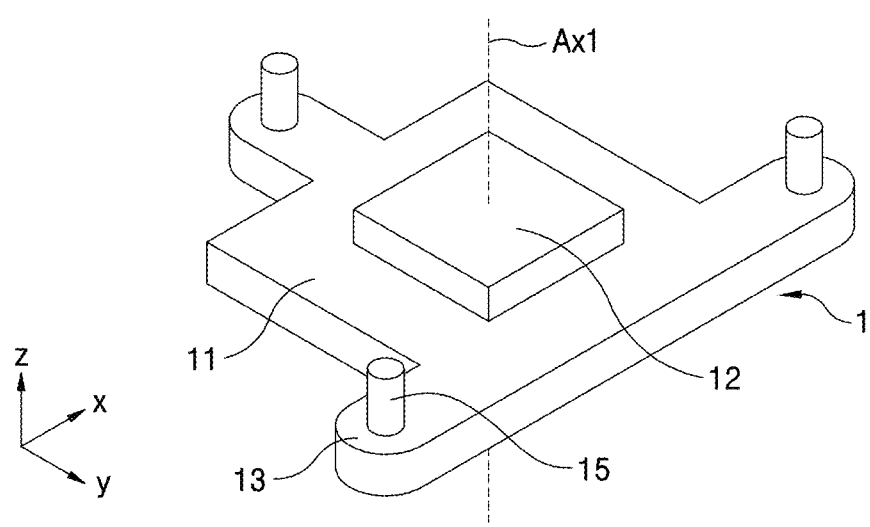

CAMERA MODULE MANUFACTURING APPARATUS, CAMERA MODULE, AND MANUFACTURING METHOD THEREOF

CROSS-REFERENCE TO RELATED APPLICATIONS

This application is a Continuation-in-part of U.S. application Ser. No. 17/214,345 filed on Mar. 26, 2021, and is based on and claims priority under 35 U.S.C. § 119 to Korean Patent Application No. 10-2020-0055361 filed on May 8, 2020. This application is also a Continuation-in-part of Korean Patent Application Nos. 10-2020-0139655 filed on Oct. 26, 2020 and 10-2021-0117661 filed on Sep. 3, 2021, in the Korean Intellectual Property Office, the disclosures of which are incorporated by reference herein in their entireties.

BACKGROUND

1. Field

Embodiments of the present disclosure relate to a camera module manufacturing apparatus, a camera module, and a manufacturing method thereof.

2. Description of the Related Art

In the case of a camera module, especially a camera module mounted on a portable electronic device, as a number of pixels decreases due to a recent high resolution and miniaturization of mobile phones, a picture quality is greatly deteriorated even with a slight distortion of an optical axis.

In addition, in the case of vehicle camera modules, with the introduction of automatic parking function, lane detection function, and around view monitoring, a distance to an object, a size and shape of the object, a matching rate with a driver's field of view, and a degree of image alignment between cameras are becoming very important.

Therefore, when the camera module is assembled by coupling the lens assembly and the substrate having the image sensor, the camera module needs to be assembled to obtain optimal image characteristics.

SUMMARY

One or more embodiments include a camera module manufacturing apparatus, in which an optical axis of a lens and an optical axis of an image sensor are aligned when the camera module is assembled by using an instantaneous curing adhesive, and productivity is maximized.

Additional aspects will be set forth in part in the description which follows and, in part, will be apparent from the description, or may be learned by practice of the presented embodiments of the disclosure.

According to one or more embodiments, a camera module manufacturing apparatus includes: a chart unit configured to provide an image for optical-axis alignment to a substrate assembly including an image sensor; a substrate alignment unit disposed opposite to the chart unit, aligning the substrate assembly, and electrically connected to the image sensor; an optical axis alignment unit configured to allow an optical axis of a lens assembly including a lens and an actuator to be aligned with respect to an optical axis of the image sensor; and a camera module fixing unit positioned adjacent to the optical axis alignment unit, and fixing the lens assembly on the substrate assembly by applying an instantaneous curing adhesive, which is an inorganic material, to the lens assembly and the substrate assembly which are aligned.

In an embodiment of the present disclosure, the substrate assembly may further include a first extension part extending in a direction crossing the optical axis, and a first fixing part provided on one side of the first extension part and protruding from a surface of the first extension part.

In an embodiment of the present disclosure, the lens assembly may further include a second extension part formed corresponding to the first extension part and having a second hole formed to receive the first fixing part at one side thereof.

In an embodiment of the present disclosure, the camera module fixing unit may apply the instantaneous curing adhesive between the second hole of the lens assembly and the first fixing part of the substrate assembly so as to fix the lens assembly on the substrate assembly.

In an embodiment of the present disclosure, the camera module fixing unit may apply the instantaneous curing adhesive in a direction from the lens assembly to the substrate assembly so as to fix the lens assembly on the substrate assembly.

In an embodiment of the present disclosure, the adhesive may include solder.

According to other embodiments, a camera module manufacturing apparatus comprises: a chart unit configured to provide an image for optical-axis alignment to a substrate assembly including an image sensor; a substrate alignment unit disposed opposite to the chart unit, aligning the substrate assembly, and electrically connected to the image sensor; an optical axis alignment unit configured to allow an optical axis of a lens assembly including a lens and an actuator to be aligned with respect to an optical axis of the image sensor; and a camera module fixing unit positioned adjacent to the optical axis alignment unit, and fixing the lens assembly on the substrate assembly by applying an instantaneous curing adhesive, which is an inorganic material, to the lens assembly and the substrate assembly which are aligned, wherein, the substrate assembly comprises a first extension part extending in a direction crossing the optical axis thereof, and the lens assembly comprises a second extension part formed to correspond to the first extension part, wherein one of the first extension part and the second extension part comprises a fixing part protruding from a surface thereof, and the other one that does not comprise the fixing part comprises a hole for receiving the fixing part, and wherein the camera module fixing unit applies the instantaneous curing adhesive between the hole and the fixing part in a state in which the hole receives the fixing part, to fix the lens assembly and the substrate assembly.

In an embodiment of the present disclosure, the fixing part is formed on the second extension part, and the hole is formed in the first extension part.

In an embodiment of the present disclosure, the camera module fixing unit applies the instantaneous curing adhesive in a direction from the substrate assembly toward the lens assembly to fix the substrate assembly on the lens assembly.

In an embodiment of the present disclosure, the instantaneous curing adhesive comprises a solder.

In an embodiment of the present disclosure, the first extension part and the second extension part are each provided as a plurality of extension parts, the substrate assembly further comprises at least a first connection part positioned between neighboring first extension parts and connecting the same to each other, and the lens assembly further comprises at least a second connection part positioned between neighboring second extension parts and connecting the same to each other.

In an embodiment of the present disclosure, the first extension part and the first connection part are integrally formed, and the second extension part and the second connection part are integrally formed.

According to another embodiments, a camera module comprises: a substrate assembly comprising an image sensor and having a first extension part extending in a direction crossing an optical axis of the image sensor; a lens assembly comprising a lens and an actuator and having a second extension part formed to correspond to the first extension part; and an instantaneous curing adhesive for fixing the lens assembly and the substrate assembly to each other, wherein one of the first extension part and the second extension part comprises a fixing part protruding from a surface thereof, and the other one that does not comprise the fixing part comprises a hole for receiving the fixing part, and the instantaneous curing adhesive is applied between the hole and the fixing part in a state in which the hole receives the fixing part, and the hole passes through the first extension part or the second extension part.

In an embodiment of the present disclosure, the fixing part is formed on the second extension part, and the hole is formed in the first extension part.

In an embodiment of the present disclosure, the instantaneous curing adhesive is applied in a direction from the substrate assembly toward the lens assembly to fix the substrate assembly on the lens assembly.

In an embodiment of the present disclosure, the instantaneous curing adhesive comprises a solder.

In an embodiment of the present disclosure, the first extension part and the second extension part are each provided as a plurality of extension parts, the substrate assembly further comprises at least a first connection part positioned between neighboring first extension parts and connecting the same to each other, and the lens assembly further comprises at least a second connection part positioned between neighboring second extension parts and connecting the same to each other.

In an embodiment of the present disclosure, the first extension part and the first connection part are integrally formed, and the second extension part and the second connection part are integrally formed.

According to another embodiments, a camera module manufacturing method comprises: providing an image for optical-axis alignment to a substrate assembly comprising an image sensor; allowing an optical axis of a lens assembly comprising a lens and an actuator to be aligned with respect to an optical axis of the image sensor; and fixing the lens assembly on the substrate assembly by applying an instantaneous curing adhesive, which is an inorganic material, to the lens assembly and the substrate assembly which are aligned, wherein the substrate assembly comprises a first extension part extending in a direction crossing the optical axis thereof, and the lens assembly comprises a second extension part formed to correspond to the first extension part, one of the first extension part and the second extension part comprises a fixing part protruding from a surface thereof, and the other one that does not include the fixing part comprises a hole for receiving the fixing part, and in the fixing of the lens assembly on the substrate assembly, the instantaneous curing adhesive is applied between the hole and the fixing part in a state in which the hole receives the fixing part to fix the lens assembly and the substrate assembly.

In an embodiment of the present disclosure, the fixing part is formed on the first extension part, and the hole is formed in the second extension part.

In an embodiment of the present disclosure, the fixing part is formed on the second extension part, and the hole is formed in the first extension part.

In an embodiment of the present disclosure, in the fixing of the lens assembly on the substrate assembly, the instantaneous curing adhesive is applied in a direction from the lens assembly toward the substrate assembly to fix the lens assembly on the substrate assembly.

In an embodiment of the present disclosure, in the fixing of the lens assembly on the substrate assembly, the instantaneous curing adhesive is applied in a direction from the substrate assembly toward the lens assembly to fix the substrate assembly on the lens assembly.

In an embodiment of the present disclosure, the instantaneous curing adhesive includes a solder.

In an embodiment of the present disclosure, the first extension part and the second extension part are each provided as a plurality of extension parts, the substrate assembly further comprises at least a first connection part positioned between neighboring first extension parts and connecting the same to each other, and the lens assembly further comprises at least a second connection part positioned between neighboring second extension parts and connecting the same to each other.

In an embodiment of the present disclosure, the first extension part and the first connection part are integrally formed, and the second extension part and the second connection part are integrally formed.

Other aspects, features, and advantages other than those described above will become apparent from the following drawings, claims, and detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is an exploded perspective view of FIG. 1;

DETAILED DESCRIPTION

Figure 1:
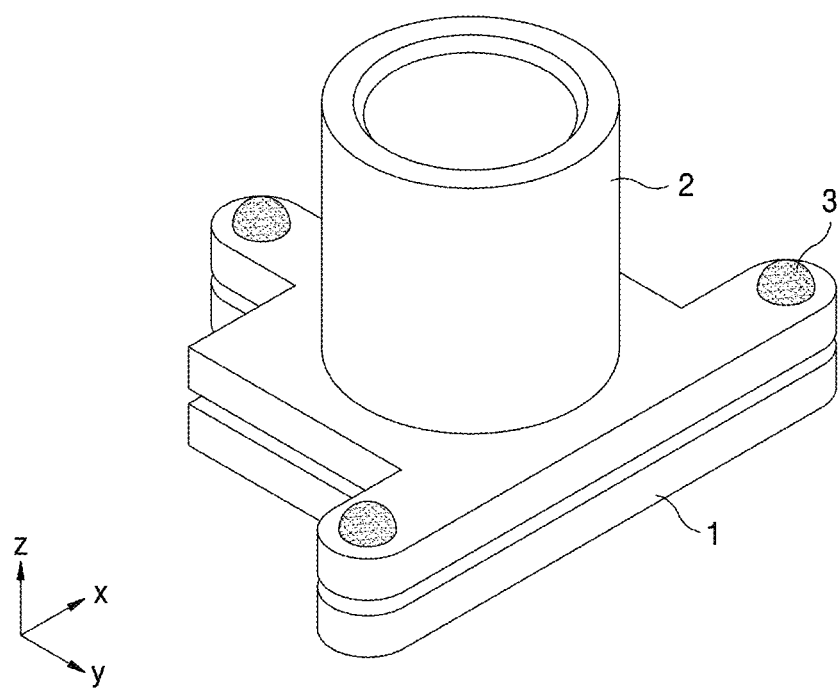
FIG. 1 is a perspective view illustrating an example of a camera module to be assembled by a camera module manufacturing apparatus according to an embodiment of the present disclosure.

Hereinafter, the following embodiments will be described in detail with reference to the accompanying drawings, and when describing with reference to the drawings, the same or corresponding constituent elements are denoted by the same reference numerals, and redundant descriptions thereof will be omitted.

Since the present embodiments can apply various transformations, specific embodiments will be illustrated in the drawings and described in detail in the detailed description. Effects and features of the present embodiments, and a method of achieving them will be apparent with reference to the contents described later in detail together with the drawings. However, the embodiments are not limited to the embodiments disclosed below and may be implemented in various forms.

In the following embodiments, terms such as first and second are used for the purpose of distinguishing one constituent element from other constituent elements rather than a limiting meaning.

In the following examples, expressions in the singular include plural expressions unless the context clearly indicates otherwise.

In the following embodiments, terms such as include or have means that the features or components described in the specification are present, and do not preclude the possibility that one or more other features or components may be added.

In the following embodiments, when a part, such as a unit, a region, or a component, is on or on another part, not only is it directly above the other part, but also another unit, region, component, etc. is interposed therebetween. Includes cases.

In the following examples, terms such as connect or combine do not necessarily mean direct and/or fixed connection or combination of two members, unless the context clearly indicates otherwise, and that another member is interposed between the two members. It is not to exclude.

It means that a feature or component described in the specification is present, and does not preclude the possibility that one or more other features or components may be added.

In the drawings, the size of components may be exaggerated or reduced for convenience of description. For example, the size and thickness of each component shown in the drawings are arbitrarily shown for convenience of description, and thus the following embodiments are not necessarily limited to those shown.

FIG. 1 is a perspective view illustrating an example of a camera module 10 to be assembled by a camera module manufacturing apparatus according to an embodiment of the present disclosure, and FIG. 2 is an exploded perspective view of FIG. 1.

Referring to FIGS. 1 and 2, an example of the camera module 10 may be a mobile, PC, and/or a camera module for a vehicle, and may include a substrate assembly 1 and a lens assembly 2. In addition, the camera module 10 may further include an adhesive part 3.

The substrate assembly 1 may have a structure in which an image sensor 12 is coupled to a PCB 11 on which a conductive wiring pattern is formed. The substrate assembly 1 may further include a first extension part 13 extending in a direction crossing a first optical axis Ax1 of the image sensor 12, and a first fixing part 15 provided on one side of the first extension part 13 and protruding from a surface of the first extension part 13.

The substrate assembly 1 may include a plurality of first extension parts 13 extending from the image sensor 12 to the outside, and may include three first extension parts 13 symmetrically disposed as shown in the drawing. However, the present disclosure is not limited thereto, and the first extension part 13 may have any structure capable of stably fixing the substrate assembly 1 and the lens assembly 2.

The first fixing part 15 may be provided at one side of the first extension part 13, may protrude from a surface of the first extension part 13, and may protrude in a measurement direction of the image sensor 12. The first fixing part 15 may be integrally formed through an injection molding process when the PCB substrate 11 is manufactured.

The lens assembly 2 may include an actuator 22 and a lens 21 received therein, and the actuator 22 may include an electrode pin (not shown) electrically connected to at least the PCB substrate 11 and/or the image sensor 12. The actuator 22 may include an actuator for autofocus and/or an actuator for camera shake correction, and the actuator for auto focus actuator and the actuator for camera shake correction may be integrally provided.

The lens assembly 2 may further include a second extension part 23 formed to correspond to the first extension part 13 of the substrate assembly 1 and having a second hole 25 formed at one side thereof to receive the first fixing part 15. For example, when three first extension parts 13 are provided, three second extension parts 23 may also be provided, and the shapes of the second extension part 23 may be the same as those of the first extension part 13. The second hole 25 may be formed as a through hole for receiving the first fixing part 15. The lens assembly 2 may be temporarily fixed to the substrate assembly 1 by coupling the second hole 25 to the first fixing part 15.

The adhesive part 3 may connect the first fixing part 15 and the second hole 25 to fix the lens assembly 2 to the substrate assembly 1. The adhesive part 3 may include an inorganic material, and as an embodiment, may include solder. The adhesive part 3 may include one or more metal materials selected from lead, lead-free, tin (Sn), silver (Ag), copper (Cu), a lead (Pb)-tin (Sn) mixture, a silver (Ag)-tin (Sn) mixture, and a copper (Cu)-tin (Sn) mixture. The number of the adhesive parts 3 corresponds to the number of each of the first extension parts 13 and the second extension parts 23, thereby stably fixing the lens assembly 2 to the substrate assembly 1.

Figure 3:
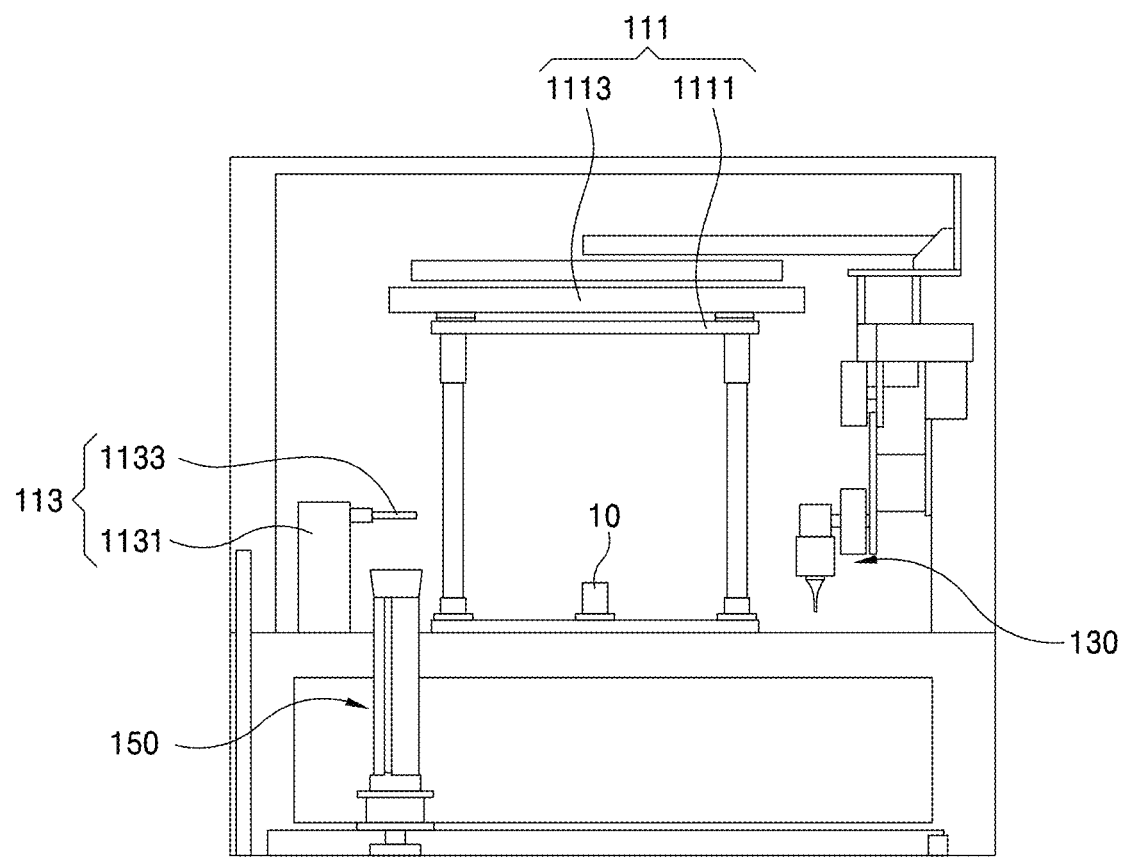
FIG. 3 is a conceptual view schematically showing a configuration of an example of a camera module manufacturing apparatus for assembling a camera module illustrated in FIG. 1.
Figure 4:
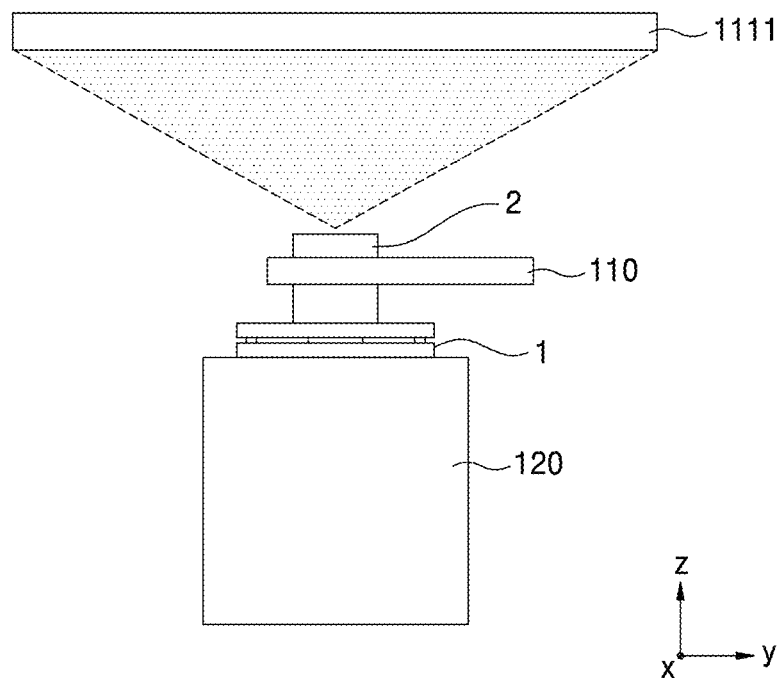
FIG. 4 is a conceptual view illustrating a portion of the configuration of the camera module manufacturing apparatus of FIG. 3.
Figure 5:
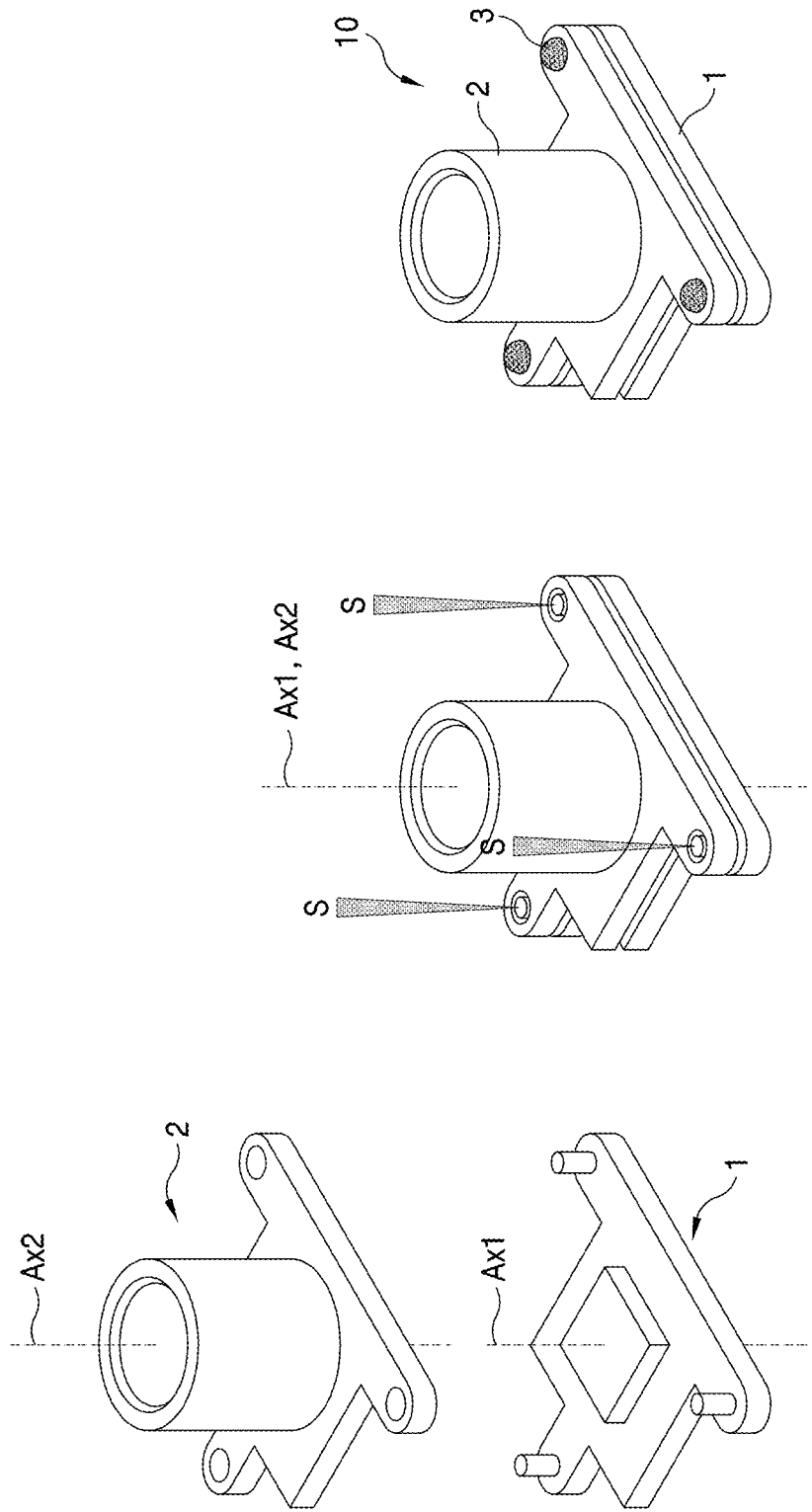
FIGS. 5A-C are views sequentially illustrating a method of manufacturing a camera module by using the camera module manufacturing apparatus of FIG. 3.

FIG. 3 is a conceptual view schematically illustrating a configuration of a camera module manufacturing apparatus 100 for assembling the camera module 10 illustrated in FIG. 1 according to an exemplary embodiment, FIG. 4 is a conceptual view illustrating a portion of the camera module manufacturing apparatus 100 of FIG. 3 according to an exemplary embodiment, and FIG. 5 is a view sequentially illustrating a method of manufacturing a camera module by using the camera module manufacturing apparatus 100 of FIG. 3.

Referring to FIGS. 3 to 5, the camera module manufacturing apparatus 100 according to an embodiment of the present disclosure may include a chart unit 111, a substrate alignment unit 120, an optical axis alignment unit 110, and a camera module fixing unit 130.

The chart unit 111 may provide an image for optical axis alignment to the substrate assembly 1 including the image sensor 12. The chart unit 111 may include at least a light source 1113 and an inspection chart 1111, and thus may allow the lens of the lens assembly 2 and the optical axis of the image sensor 12 to be aligned with respect to each other. That is, the image sensor 12 senses an image of the inspection chart passing through the lens in a state in which the light source 1113, the inspection chart 1111, the lens, and the image sensor are sequentially aligned from the top of the drawing, to determine whether the optical axis of the lens is aligned with the optical axis of the image sensor 12.

The light source 1113 may irradiate light downward, that is, toward the camera module, as shown in FIG. 3, and the inspection chart 1111 may be disposed on a light path of the light. The inspection chart 1111 may be a light-transmissive film on which an inspection pattern for inspecting the camera module 10 is formed. In an embodiment, an inspection pattern for evaluating the degree of resolution of the camera module 10 may be formed. The inspection chart 1111 may be coupled to the light source 1113 by a separate fixing device. However, the present disclosure is not limited thereto, and the light source 1113 and the inspection chart 1111 may be integrally formed. For example, the inspection pattern may be printed on a surface of the light source 1113.

The substrate alignment unit 120 may be disposed to face the chart unit 111, may align the substrate assembly 1, and may be electrically connected to the image sensor 12. The substrate alignment unit 120 may include a mounting portion (not shown) on which the substrate assembly 1 is mounted. The mounting portion may be provided such that the substrate assembly 1 is mounted on an upper surface thereof, and may include a terminal portion (not shown) to be in contact with the substrate assembly 1 mounted thereon and electrically connected to the image sensor 12. In this case, the terminal portion (not shown) may be electrically connected to a power source and a control unit (not shown) to transmit an image obtained through the image sensor 12 to the control unit (not shown).

In addition, although not shown, the mounting portion may include a driving unit for X-axis movement (x), Y-axis movement (y), Z-axis movement (z), R-axis rotation (R), and tilting (yawing Tx, Pitching Ty) so as to align the position of the substrate assembly 1 mounted on the upper surface thereof. The mounting portion may perform a function of finely aligning the position of the substrate assembly 1 by the driving unit.

The optical axis alignment unit 110 may align the lens assembly 2 including the lens and the actuator with respect to the image sensor 12. In other words, the optical axis alignment unit 110 may optically align an second optical axis Ax2 of the lens of the lens assembly 2 with respect to a first optical axis Ax1 (see FIG. 2) of the image sensor 12 of the substrate assembly 1, and then, the lens assembly 2 is coupled to the substrate assembly 1 to thereby form a camera module.

The optical axis alignment unit 110 may further include a gripping unit 113 configured to grip the lens assembly 2 so as to enable the alignment of the second optical axis Ax2 with respect to the first optical axis Ax1. The gripping unit 113 may be electrically connected to a control unit (not shown) in which the obtained image of the camera module 10 is previously stored. The control unit may inspect the optical axis of the camera module 10 using the stored image, and may control the gripping unit 113 to align the second optical axis Ax2 of the lens of the lens assembly 2 to be in correspondence with the first optical axis Ax1 of the image sensor 12.

For example, the control unit may align the lens assembly 2 with respect to the substrate assembly 1 by controlling the gripping unit 113 in such a way that the second optical axis Ax2 coincides with the first optical axis Ax1. The gripping unit 113 may include a first guide 1131 extending in at least one of the x-direction and the y-direction, and a gripper 1133 which grips the lens assembly 2 while reciprocating along the first guide 1131 or reciprocating in the z-direction.

The driving of the gripping unit 113 may correspond to the driving of the substrate alignment unit 120. For example, when the substrate alignment unit 120 is driven in five axes by the X-axis movement (x), the Y-axis movement (y), the R-axis rotation (R), and the tilting (Tx, Ty), the gripping unit 113 may be driven in the Z-axis movement (z). In an embodiment, when the substrate alignment unit 120 is driven in four axes by the X-axis movement (x), the Y-axis movement (y), the Z-axis movement (z), and the R-axis rotation (R), the gripping unit 113 may be driven in the tilting (Tx, Ty) manner. In other words, the driving operations of the substrate alignment unit 120 and the gripping unit 113 may be complementarily performed.

The camera module fixing unit 130 may be positioned adjacent to the optical axis alignment unit 110. The camera module fixing unit 130 may fix the lens assembly 2 on the substrate assembly 1 by applying an instantaneous curing adhesive, which is an inorganic material, to the lens assembly 2 and the substrate assembly 1 which are aligned with respect to each other by the optical axis alignment unit 110. In this case, the instantaneous curing adhesive may include an inorganic material, for example, solder. The camera module fixing unit 130 may be a soldering unit.

Although not shown, the camera module fixing unit 130 may include a second guide extending in the x-direction and the y-direction, and an adhesive application unit (not shown) which applies an instantaneous curing adhesive between the lens assembly 2 and the substrate assembly 1 while reciprocating along the second guide or reciprocating in the z-direction.

The adhesive application unit may include an adhesive supply unit for supplying an adhesive and a heating unit for applying heat to the adhesive supplied from the adhesive supply unit. The adhesive supply unit and the heating unit may move together while being coupled to each other, and may supply an adhesive between the lens assembly 2 and the substrate assembly 1 and simultaneously apply heat so as to fix the lens assembly 2, of which optical axis is aligned, on the substrate assembly 1. The adhesive supply unit may supply an adhesive including at least one metal material selected from lead, lead-free lead, tin (Sn), silver (Ag), copper (Cu), a lead (Pb)-tin (Sn) mixture, a silver (Ag)-tin (Sn) mixture, a copper (Cu)-tin (Sn) mixture, in the form of solder, cream solder, and solder ball. The heating unit may include an iron or a laser, capable of supplying heat to the adhesive. However, the types of the adhesive supply unit and the heating unit are not limited to the above-described types, and various types of soldering methods using an instantaneous curing adhesive can be applicable to the adhesive application unit.

The camera module fixing unit 130 may fix the lens assembly 2 on the substrate assembly 1 by applying an instantaneous curing adhesive between the second hole 25 (see FIG. 2) of the lens assembly 2 and the first fixing part 15 of the substrate assembly 1. According to an embodiment, the camera module fixing unit 130 may apply an instantaneous curing adhesive S in a direction from the lens assembly 2 to the substrate assembly 1.

As illustrated in FIG. 5, the lens assembly 2 of which the optical axes Ax1 and Ax2 are aligned by the optical axis alignment unit 110, may be preliminarily fixed on the substrate assembly 1 by coupling the second hole 25 and the first fixing part 15 (see FIG. 5A). The camera module fixing unit 130 may apply the instantaneous curing adhesive S to the second hole 25 so as to fix the second hole 25 and the first fixing part 15 received by the second hole 25 (see FIG. 5B). Accordingly, the lens assembly 2 is fixed, by the adhesive part 3 formed by the instantaneous curing adhesive S, on the substrate assembly 1 in a state in which the optical axis thereof is aligned, thereby completing the camera module 10 (see FIG. 5C).

In an embodiment, a transfer unit 150 may be further included. The transfer unit 150 may transfer elements such as the lens assembly 2 and the substrate assembly 1, or transfer the manufactured camera module 10.

Camera module manufacturing apparatuses according to embodiments of the present disclosure can minimize the optical axis distortion of a camera module by using an instantaneous curing adhesive, that is, an adhesive including a solder, which provides a fixing force instantly. In addition, in the case of camera module manufacturing apparatuses according to embodiments of the present disclosure can apply an instantaneous curing adhesive in a direction from a lens assembly to a substrate assembly, thereby enabling a chart unit to be provided above the camera module. Accordingly, the camera module manufacturing apparatuses according to embodiments of the present disclosure can be directly applied without changing the structure of existing equipment.

Figure 6:
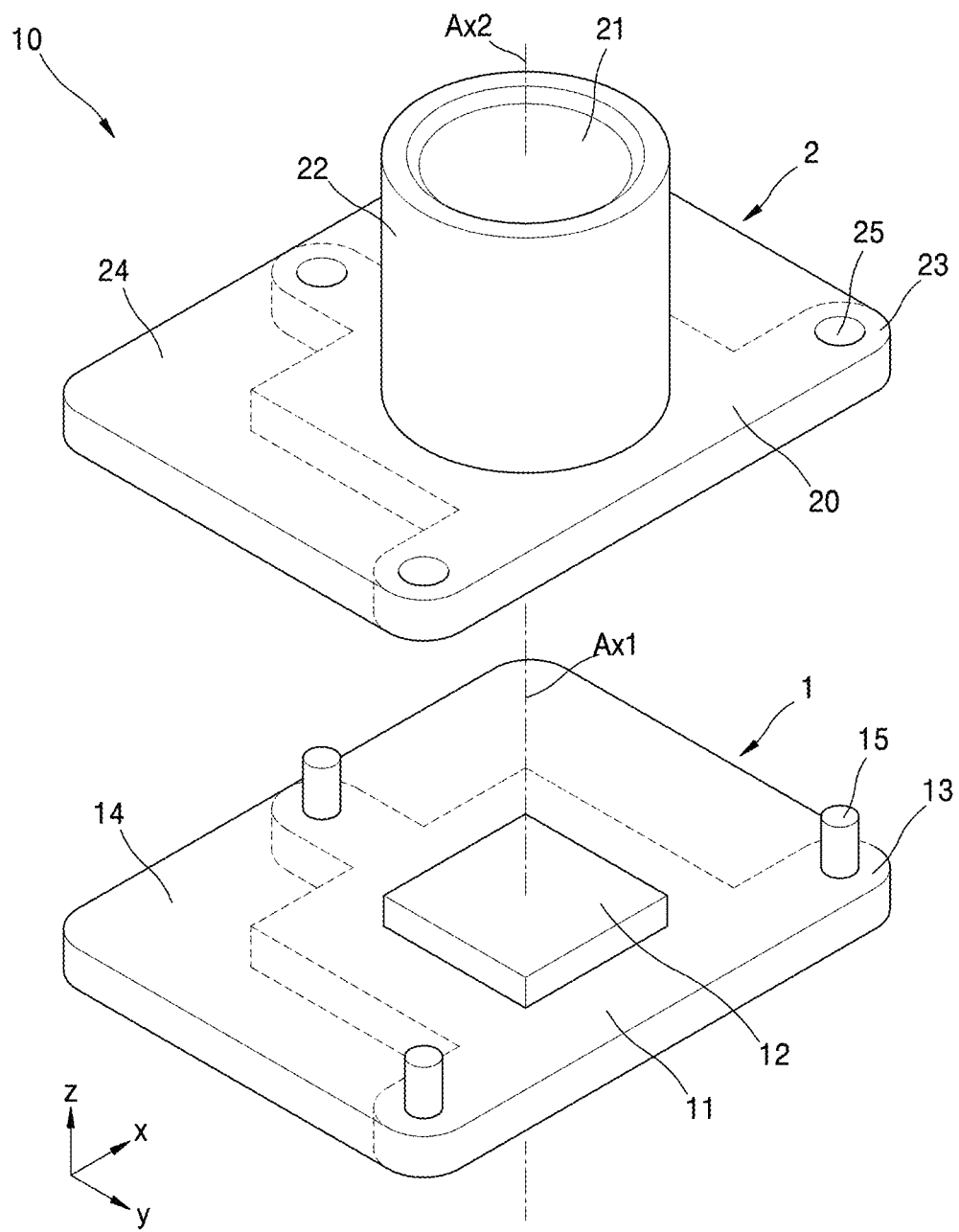
FIG. 6 is an exploded perspective view illustrating an example of a camera module to be assembled by a camera module manufacturing apparatus according to an embodiment of the present disclosure.

FIG. 6 is an exploded perspective view illustrating an example of a camera module to be assembled by a camera module manufacturing apparatus according to an embodiment of the present disclosure.

Similar to the embodiment illustrated in FIG. 2, another embodiment of the camera module 10 may include the substrate assembly 1 and the lens assembly 2. Although not shown, an adhesive part may be further included in the coupling portion of the substrate assembly 1 and the lens assembly 2. The same reference numerals are used for the same members as in the embodiment illustrated in FIG. 2, and overlapping descriptions are omitted.

As in the embodiment illustrated in FIG. 2, the substrate assembly 1 may include a plurality of first extension parts 13 extending from the PCB substrate 11 in a direction crossing the first optical axis Ax1 of the image sensor 12, and the substrate assembly 1 may further include, in addition to the first extension parts 13, a first connection part 14 extending from the PCB substrate 11 and positioned between neighboring first extension parts 13. The first connection part 14 is formed to connect in between neighboring first extension parts 13, and may also be connected to the substrate 11 between neighboring first extension parts 13.

The first connection part 14 may be integrally formed with the substrate 11 and/or the first extension part 13, and a conductive wire pattern electrically connected to the conductive wire pattern formed on the substrate 11 may be formed thereon, and at least one electronic device electrically connected to the conductive wire pattern may be mounted thereon. As in the embodiment illustrated in FIG. 2, the substrate assembly 1 may include a first fixing part 15 protruding from the first extension part 13.

Due to the first connection part 14, the entire area of the substrate 11 connected to the image sensor 12 may be further enlarged, and accordingly, the degree of freedom in designing the conductive wire pattern may be increased. In addition, due to the formation of a rectangular planar structure as a whole by the assembly structure of the first connection part 14 and the substrate 11, when the camera module 10 is mounted on another apparatus, compatibility thereof with other apparatuses can be improved.

As illustrated in FIG. 6, the substrate assembly 1 may include two first connection parts 14 to connect neighboring first extension parts 13, but the present disclosure is not limited thereto, and any structure according to the design conditions of the substrate assembly 1 may be provided.

Like the embodiment illustrated in FIG. 2, the lens assembly 2 may include an actuator 22 and a lens 21. The actuator 22 is provided on a support 20, and at least an electrode pin (not shown) electrically connected to the PCB substrate 11 and/or the image sensor 12, may be installed on the support 20. A plurality of second extension parts 23 extending from the support 20 in a direction crossing the second optical axis Ax2 of the lens 21 may be included. The embodiment illustrated in FIG. 6 may further include, in addition to the second extension parts 23, a second connection part 24 extending from the support 20 and positioned between neighboring second extension parts 23. The second connection part 24 may be formed to connect in between neighboring second extension parts 23, and may also be connected to the substrate 20 between neighboring second extension parts 23.

The second connection part 24 may be integrally formed with the support 20 and/or the second extension part 23, and optionally a conductive wire pattern electrically connected to the conductive wire pattern formed on the support 20 may be formed thereon. Like the embodiment illustrated in FIG. 2, the lens assembly 2 may include a second hole 25 formed in the second extension part 23.

Due to the second connection part 24, the total area of the support 20 is further enlarged, and accordingly, the degree of freedom in design can be increased. In addition, due to the formation of a rectangular planar structure as a whole by the assembly structure of the first connection part 14 and the substrate 11, when the camera module 10 is mounted on another apparatus, compatibility thereof with other apparatuses can be improved.

As illustrated in FIG. 6, the lens assembly 2 may include two second connection parts 24 to connect neighboring second extension parts 23, but the present disclosure is not limited thereto, and any structure according to the design conditions of the lens assembly 2 may be provided.

Figure 7:
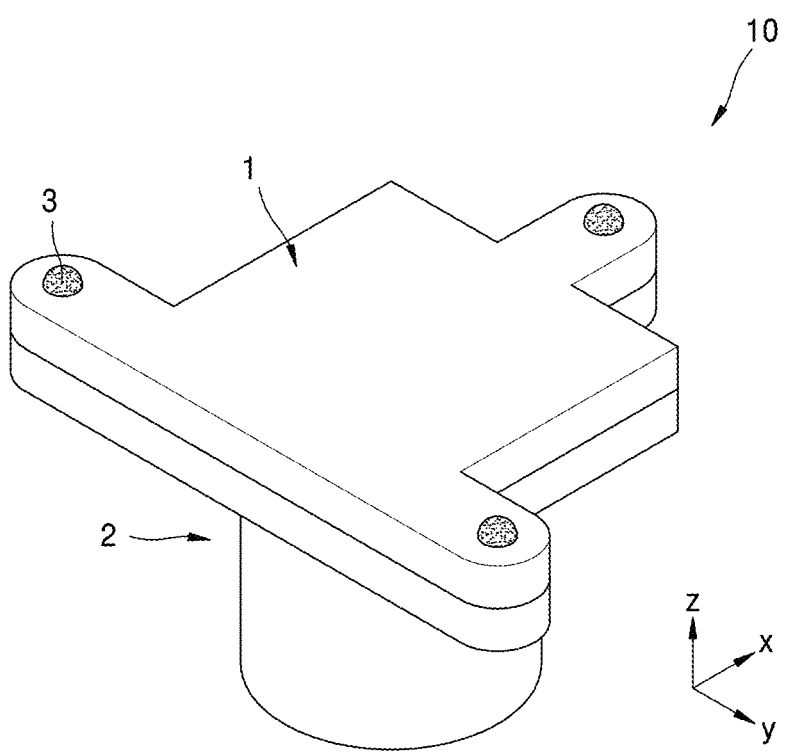
FIG. 7 is an exploded perspective view illustrating an example of a camera module to be assembled by a camera module manufacturing apparatus according to an embodiment of the present disclosure.
Figure 8:
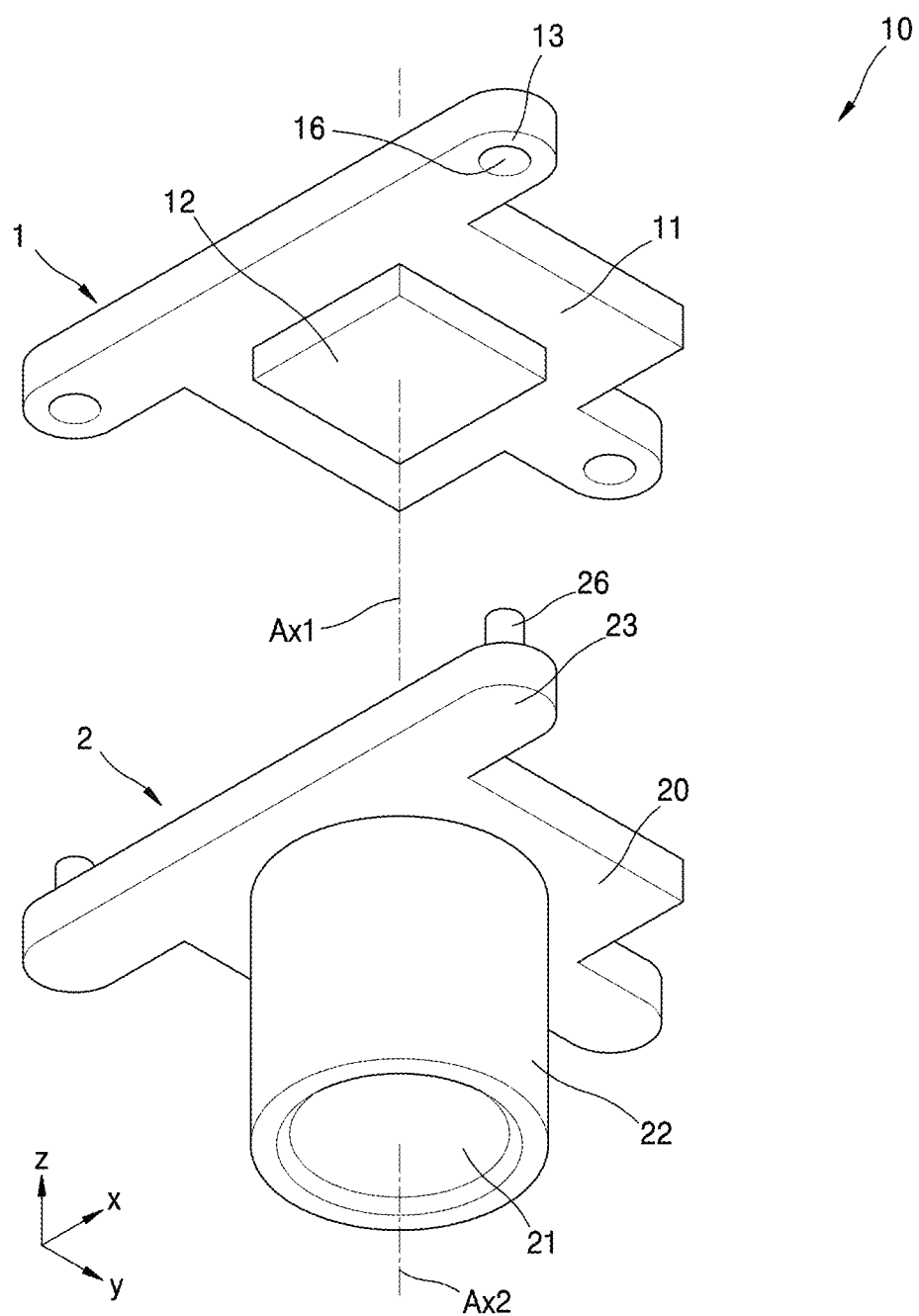
FIG. 8 is an exploded perspective view of FIG. 7.

FIG. 7 is a perspective view illustrating an example of a camera module 10 to be assembled by a camera module manufacturing apparatus according to an embodiment of the present disclosure, and FIG. 8 is an exploded perspective view of FIG. 7.

Referring to FIGS. 7 and 8, the camera module 10 according to another embodiment may include the substrate assembly 1, the lens assembly 2, and the adhesive part 3. The same reference numerals are used for the same members as in the embodiment illustrated in FIG. 2, and overlapping descriptions are omitted.

Unlike the embodiment illustrated in FIG. 2, the camera module 10 according to the embodiment illustrated in FIGS. 7 and 8, in the z-axis direction, the substrate assembly 1 is dispose above the lens assembly 2. A first hole 16 may be formed in the first extension part 13 of the substrate assembly 1, and a second fixing part 26 may be formed on a surface of the second extension part 23 of the lens assembly 2 facing the first hole 16. The first hole 16 and the second fixing part 26 may be formed at positions corresponding to each other, such that the second fixing part 26 is inserted into the first hole 16. The second fixing part 26 may be integrally formed through an injection process when the second extension part 23 is manufactured.

The substrate assembly 1 may be temporarily fixed on the lens assembly 2 by coupling between the first hole 16 and the second fixing part 26.

Figure 11C:
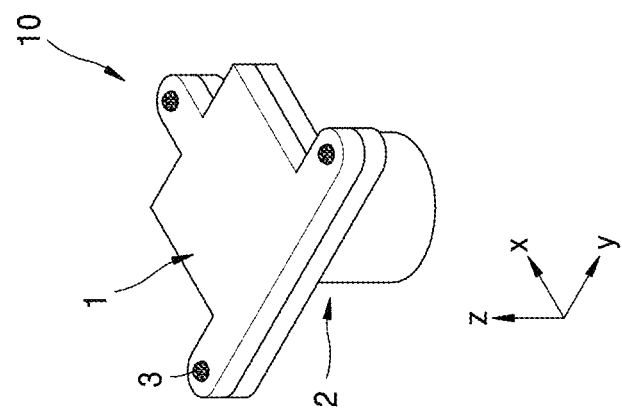
FIGS. 11A-C are views sequentially illustrating a method of manufacturing a camera module by using the camera module manufacturing apparatus of FIG. 9.

As illustrated in FIG. 11C to be described later, the adhesive part 3 may connect the second fixing part 26 with the first hole 16 to fix the substrate assembly 1 on the lens assembly 2. The adhesive part 3 may include the same material as in the previous embodiments. The adhesive part 3 may be formed in a number corresponding to the number of the first extension parts 13 and the second extension parts 23 to stably fix the substrate assembly 1 on the lens assembly 2.

Figure 9:
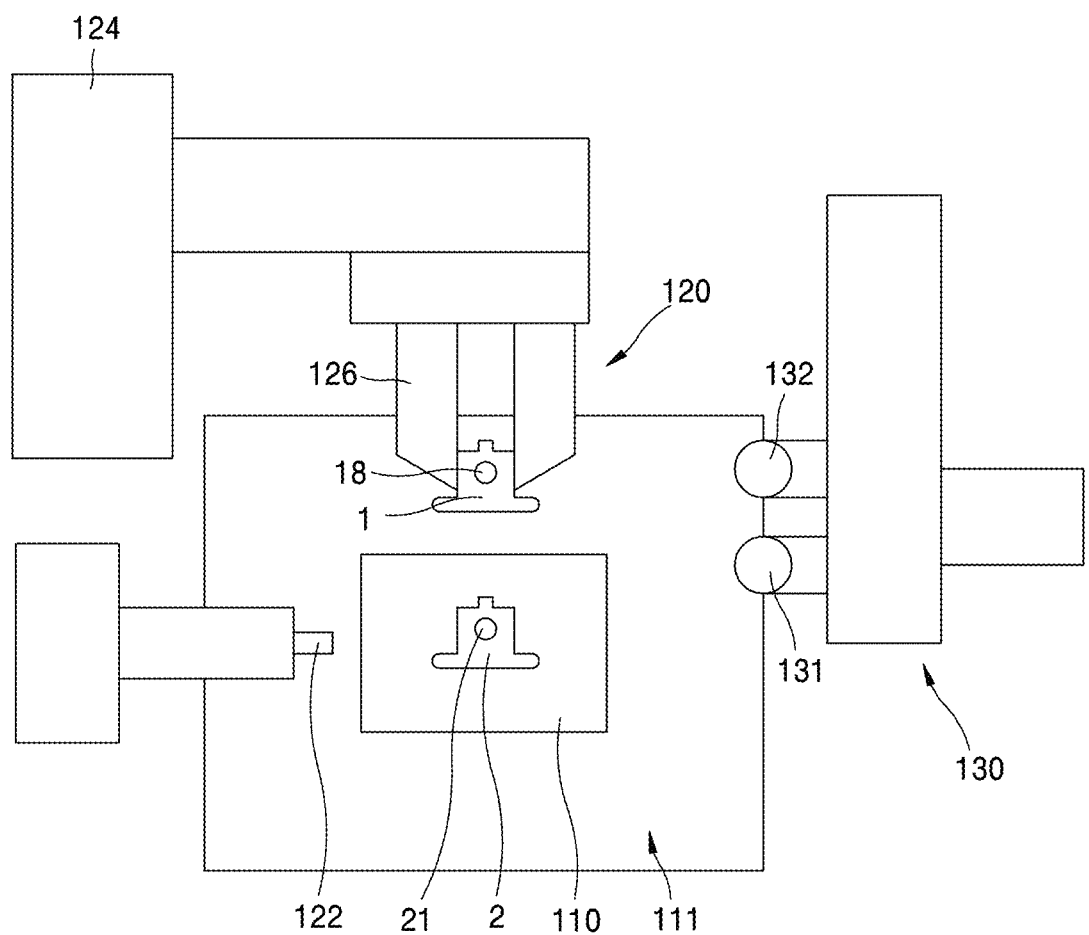
FIG. 9 is a conceptual diagram schematically showing a configuration of an example of a camera module manufacturing apparatus for assembling a camera module illustrated in FIG. 7.
Figure 10:
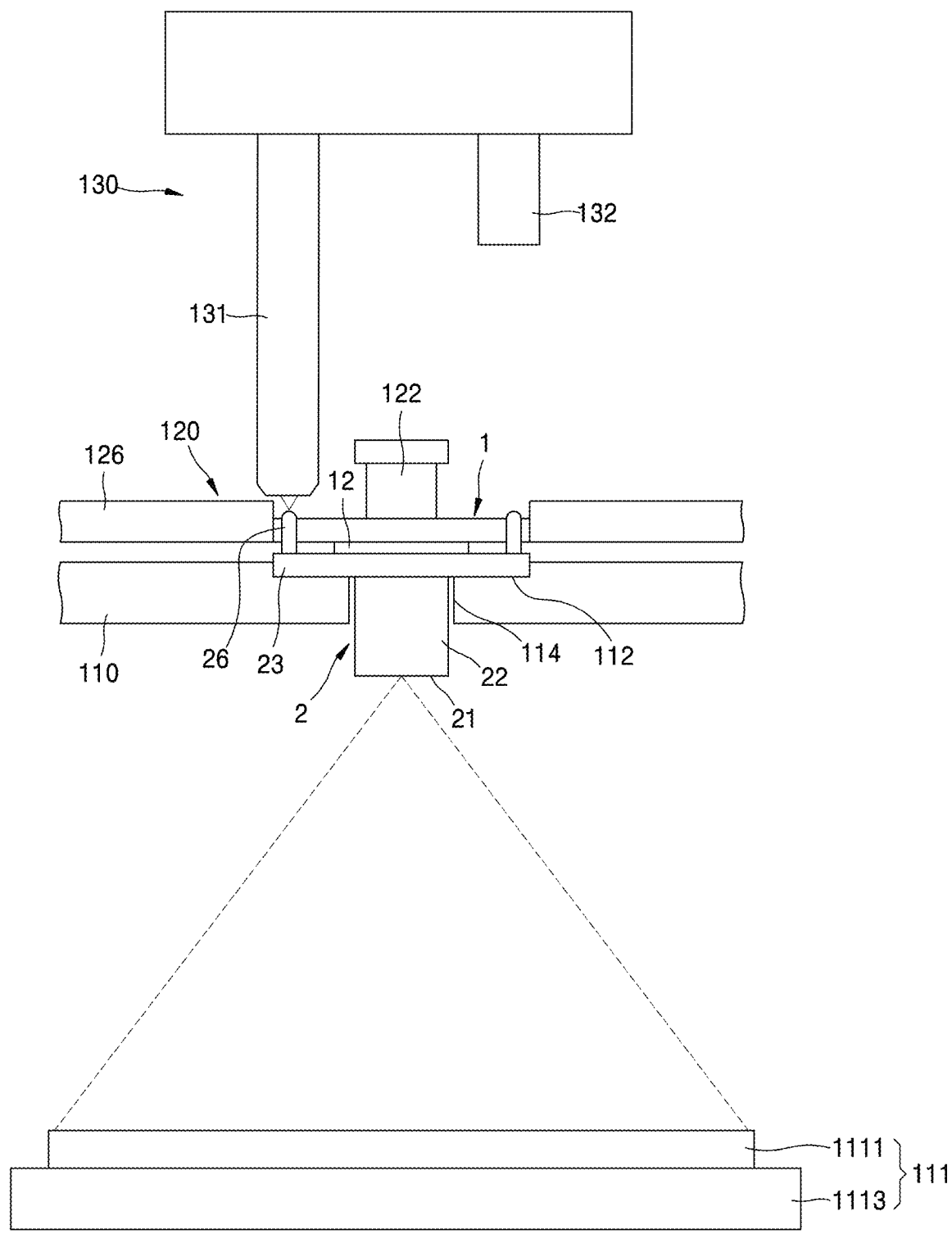
FIG. 10 is a conceptual diagram illustrating a portion of the configuration of the camera module manufacturing apparatus of FIG. 9.

FIG. 9 is a conceptual diagram schematically showing the configuration of another embodiment of the camera module manufacturing apparatus 100 according to the present disclosure, and a diagram illustrating an apparatus for assembling the camera module 10 shown in FIG. 7. FIG. 10 is a conceptual diagram illustrating a portion of the configuration of the camera module manufacturing apparatus 100 of FIG. 9. FIG. 11 is a view sequentially illustrating a method of manufacturing a camera module by using the camera module manufacturing apparatus 100 of FIG. 9.

Referring to FIGS. 9 to 11, as in the embodiment according to FIGS. 3 to 5 described above, the camera module manufacturing apparatus 100 according to an embodiment may include a chart unit 111, the substrate alignment unit 120, the optical axis alignment unit 110, and the camera module fixing unit 130. Hereinafter, descriptions of the same components as those of FIGS. 3 to 5 will be omitted.

Referring to FIGS. 9 to 11, in the camera module manufacturing apparatus 100 according to an embodiment of the present disclosure, the chart unit 111 is disposed on the lower portion thereof, and the lens assembly 2 and the substrate assembly 1 are sequentially arranged above the chart unit 111 to perform inspection and/or assembly.

That is, as shown in FIGS. 9 and 10, a light source 1113 and an inspection chart 1111 may be arranged thereunder, and the lens assembly 2 may be disposed above the inspection chart 1111 while facing the inspection chart 1111. The substrate assembly 1 may be disposed above the lens assembly 2. That is, in a state in which the light source 1113, the inspection chart 1111, the lens 21, and the image sensor 12 are sequentially aligned from the bottom, the image sensor 12 senses the image of the inspection chart 1111 that has passed through the lens 21 to determine whether the optical axis of the lens 21 is aligned with the optical axis of image sensor 12.

The substrate alignment unit 120 may be disposed to face the chart unit 111, may align the substrate assembly 1, and may be electrically connected to the image sensor 12. The substrate alignment unit 120 may include a terminal portion 122 which is provided to contact a pad 18 positioned on the rear surface of the substrate assembly 1 and being in an electric contact with the image sensor 12, so as to have an electric connection with the image sensor 12. In this case, the terminal portion 122 may be electrically connected to a power source and a control unit (not shown) to transmit an image obtained through the image sensor 12 to the control unit (not shown).

Optionally, the substrate alignment unit 120 may include a driving unit 124 for X-axis movement (x), Y-axis movement (y), Z-axis movement (z), R-axis rotation (R), and tilting (yawing Tx, pitching Ty) so as to align the position of the substrate assembly 1. The driving unit 124 may perform the function of finely aligning the position of the substrate assembly 1.

The substrate alignment unit 120 may further include a gripping unit 126 configured to grip the substrate assembly 1 so as to enable the alignment of the first optical axis Ax1 with the second optical axis Ax2. The gripping unit 126 may be electrically connected to the control unit (not shown). The driving unit 124 and the gripping unit 126 may be operated by the operation of the control unit, and accordingly, the driving unit 124 and the gripping unit 126 may adjust the position of the substrate assembly 1 in such a way that the image sensor 12 of the substrate assembly 1 performs the optical-axis alignment with respect to the lens 21 of the lens assembly 2.

The optical axis alignment unit 110 may be provided to align the optical axis of the lens assembly 2 including the lens 21 and the actuator 22 with respect to the optical axis of the image sensor 12. In other words, the optical axis alignment unit 110 may include a seating part 112 for seating the same, and, the lens 21 of the lens assembly 2 may be seated on the seating part 112 while facing the chart unit 111 located thereunder. The seating part 112 has an opening 114 in the center thereof to allow the lens 21 of lens assembly 2 to take the image of the chart unit 111 located thereunder. As described above, the optical axis alignment unit 110 including the seating part 112 may be provided to be fixed so as not to move, and accordingly, the relative positioning of the lens assembly 2 and the substrate assembly 1 may be adjusted by the substrate alignment unit 120.

Optionally, although not shown, even in the optical axis alignment unit 110, a driving unit (not shown) for X-axis movement (x), Y-axis movement (y), Z-axis movement (z), R-axis rotation (rolling, R), and/or tilting (yawing Tx, pitching Ty) may be provided. The substrate alignment unit 120 and the optical axis alignment unit 110 may operate complementary to each other.

By the optical axis alignment unit 110 and the substrate alignment unit 120, the second optical axis Ax2 of the lens 21 of the lens assembly 2 may be aligned with respect to the first optical axis Ax1 (see FIG. 8) of the image sensor 12 of the substrate assembly 1, and then, a camera module in which the lens assembly 2 is coupled to the substrate assembly 1, may be formed.

The lens assembly 2 may be seated on the seating part 112 of the optical axis alignment unit 110 by a separate transfer unit (not shown), and the transfer unit may also transfer the substrate assembly 1 to a separate standby position.

Next, the substrate assembly 1 may be temporarily coupled to the lens assembly 2 by the gripping unit 126 of the substrate alignment unit 120. In this state, the terminal portion 122 of the substrate alignment unit 120 may be connected to the pad 18 of the substrate assembly 1, applying of power, checking of the image sensor, and the like may be performed.

The control unit (not shown) may control the substrate alignment unit 120 and/or the optical axis alignment unit 110 such that the first optical axis Ax1 coincides with the second optical axis Ax2 to align the optical axis of the substrate assembly 1 with respect to the optical axis of the lens assembly 2. At this time, the control unit may operate the chart unit 111, controls the image sensor 12 to take the image of the inspection chart 1111, and determines whether the optical-axis alignment is correct based on the obtained image.

In addition to this inspection of optical-axis alignment, optionally, the control unit enables the optical-axis alignment of the image sensor 12 of the substrate assembly 1 with respect to the lens 21 of the lens assembly 2 by finely adjusting the relative positions of lens assembly 2 and substrate assembly 1.

When the optical-axis alignment of lens assembly 2 and substrate assembly 1 is not within a certain error range, the control unit unloads the lens assembly 2 and the substrate assembly 1 without performing the bonding process. When the optical-axis alignment of lens assembly 2 and the substrate assembly 1 is within a certain error range, the control unit may control the camera module fixing unit 130 to apply an instantaneous curing adhesive, which is an inorganic material, to the lens assembly 2 and the substrate assembly 1 which are aligned with respect to each other, to fix the substrate assembly 1 on the lens assembly 2.

That is, the camera module fixing unit 130 may apply an instantaneous curing adhesive between the first hole 16 of the substrate assembly 1 and the second fixing part 26 of the lens assembly 2 so as to fix the substrate assembly 1 on the lens assembly 2.

The camera module fixing unit 130 may be positioned adjacent to the optical axis alignment unit 110 and/or the substrate alignment unit 120. The camera module fixing unit 130 may fix the substrate assembly 1 on the lens assembly 2 by applying an instantaneous curing adhesive, which is an inorganic material, to the lens assembly 2 and the substrate assembly 1 which are aligned with respect to each other by the optical axis alignment unit 110. In this case, the instantaneous curing adhesive may include an inorganic material, for example, solder. The camera module fixing unit 130 may be a soldering unit.

The camera module fixing unit 130 may include an adhesive applying unit 131 that applies an instantaneous curing adhesive between the lens assembly 2 and the substrate assembly 1 while reciprocating in the x-direction, y-direction, and/or z-direction. In an embodiment, the camera module fixing unit 130 may include a measurement unit 132 to determine a position to which an adhesive is to be applied.

The adhesive applying unit may include an adhesive supply unit for supplying an adhesive and a heating unit for applying heat to the adhesive supplied from the adhesive supply unit. The adhesive supply unit and the heating unit may move together while being coupled to each other, and may supply an adhesive between the lens assembly 2 and the substrate assembly 1 and simultaneously apply heat so as to fix the lens assembly 2, of which optical axis is aligned, on the substrate assembly 1. Like the previous embodiment, the adhesive applying unit 131 may use various types of soldering methods using an instantaneous curing adhesive. The measurement unit 132 may be provided as a machine vision apparatus so that the adhesive applying unit 131 may recognize a position to which an adhesive is to be applied. The adhesive applying unit 131 and the measurement unit 132 may be connected to a control unit.

In an embodiment, the camera module fixing unit 130 may apply the instantaneous curing adhesive S in a direction from the substrate assembly 1 to the lens assembly 2.

Figure 11B:
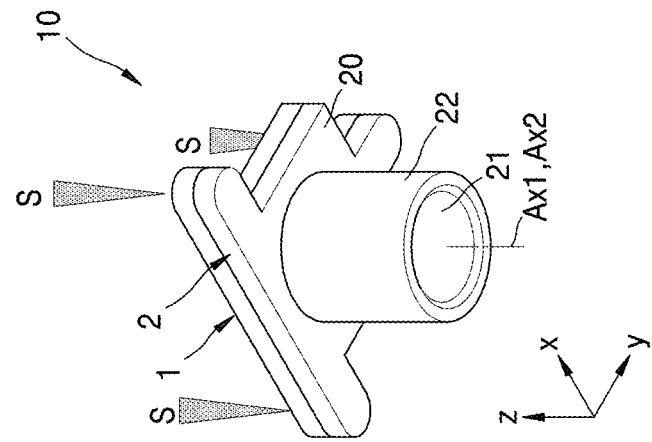
Figure 11A:
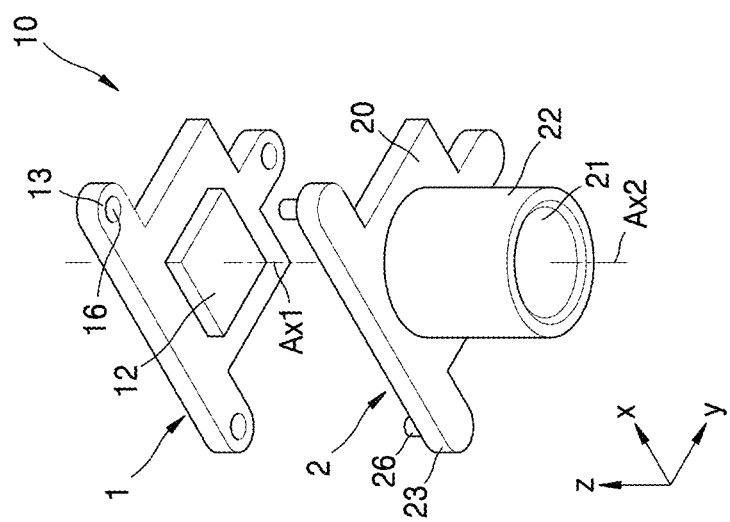

The camera module manufacturing apparatus 100 according to an embodiment of the present disclosure may temporarily assemble the substrate assembly 1 to the lens assembly 2 as shown in FIG. 11A, followed by loading the resultant structure to the optical axis alignment unit 110. In this state, the control unit may couple the terminal portion 122 of the substrate alignment unit 120 to the pad 18 of the substrate assembly 1 to be electrically connected to the image sensor 12, and check the image sensor 12. Next, the control unit operates the chart unit 111 and receives the image of the inspection chart 1111 from the image sensor 12 to inspect whether the optical axis is aligned. Additionally and/or alternatively, the control unit may operate the substrate alignment unit 120 and/or the optical axis alignment unit 110 to finely adjust the relative positions of the lens assembly 2 and the substrate assembly 1 to achieve the optical-axis alignment. When the optical-axis alignment of the lens assembly 2 and the substrate assembly 1 is not within a certain error range, the control unit unloads the lens assembly 2 and the substrate assembly 1 without performing the bonding process. When the optical-axis alignment of lens assembly 2 and substrate assembly 1 is within a certain error range, as illustrated in FIG. 11B, the control unit may control the camera module fixing unit 130 to apply the instantaneous curing adhesive S, which is an inorganic material, to the lens assembly 2 and the substrate assembly 1 which are aligned with respect to each other, to fix the lens assembly 2 on the substrate assembly 1. Accordingly, the substrate assembly 1 is fixed, by the adhesive part 3 formed by the instantaneous curing adhesive S, on the substrate assembly 1 in a state in which the optical axis thereof is aligned with the optical axis of the lens assembly 2, thereby completing the camera module 10 (see FIG. 11C). In this case, since the adhesive part 3 is applied in the direction from the substrate assembly 1 to the lens assembly 2 to fix the substrate assembly 1 on the lens assembly 2, the shape of adhesive part 3 is visible when viewed from the top surface of substrate assembly 1.

As such, in the camera module manufacturing apparatus 100 according to the embodiment of the present disclosure, the chart unit 111 is disposed at the lower position, and the inspection and assembly process may be performed in a state in which the lens assembly 2 faces downward. Accordingly, the substrate alignment unit 120 and/or the camera module fixing unit 130 may move freely without interfering with the chart unit 111 and/or the optical axis alignment unit 110. That is, according to an embodiment of the present disclosure, the substrate alignment unit 120, the chart unit 111, the optical axis alignment unit 110, and the camera module fixing unit 130 may operate without interfering with each other.

Therefore, once the lens assembly 2 and the substrate assembly 1 are loaded into an equipment, the camera module fixing unit 130 may operate in a state where the substrate alignment unit 120 and/or the optical axis alignment unit 110 are operating together with the chart unit 111, and accordingly, the camera module can be fixed simultaneously with the optical-axis alignment and/or immediately after the optical-axis alignment is completed, resulting in greatly shortening the overall assembly time.

In an embodiment, a transfer unit (not shown) may be further included. The transfer unit (not shown) may transfer elements such as the lens assembly 2 and the substrate assembly 1, or transfer the manufactured camera module 10.

Camera module manufacturing apparatuses according to embodiments of the present disclosure can minimize the optical axis distortion of a camera module by using an instantaneous curing adhesive, that is, an adhesive including a solder, which provides a fixing force instantly. In addition, in the case of camera module manufacturing apparatuses according to embodiments of the present disclosure can apply an instantaneous curing adhesive in a direction from a lens assembly to a substrate assembly, thereby enabling a chart unit to be provided above the camera module. Accordingly, the camera module manufacturing apparatuses according to embodiments of the present disclosure can be directly applied without changing the structure of existing equipment.

Figure 12:
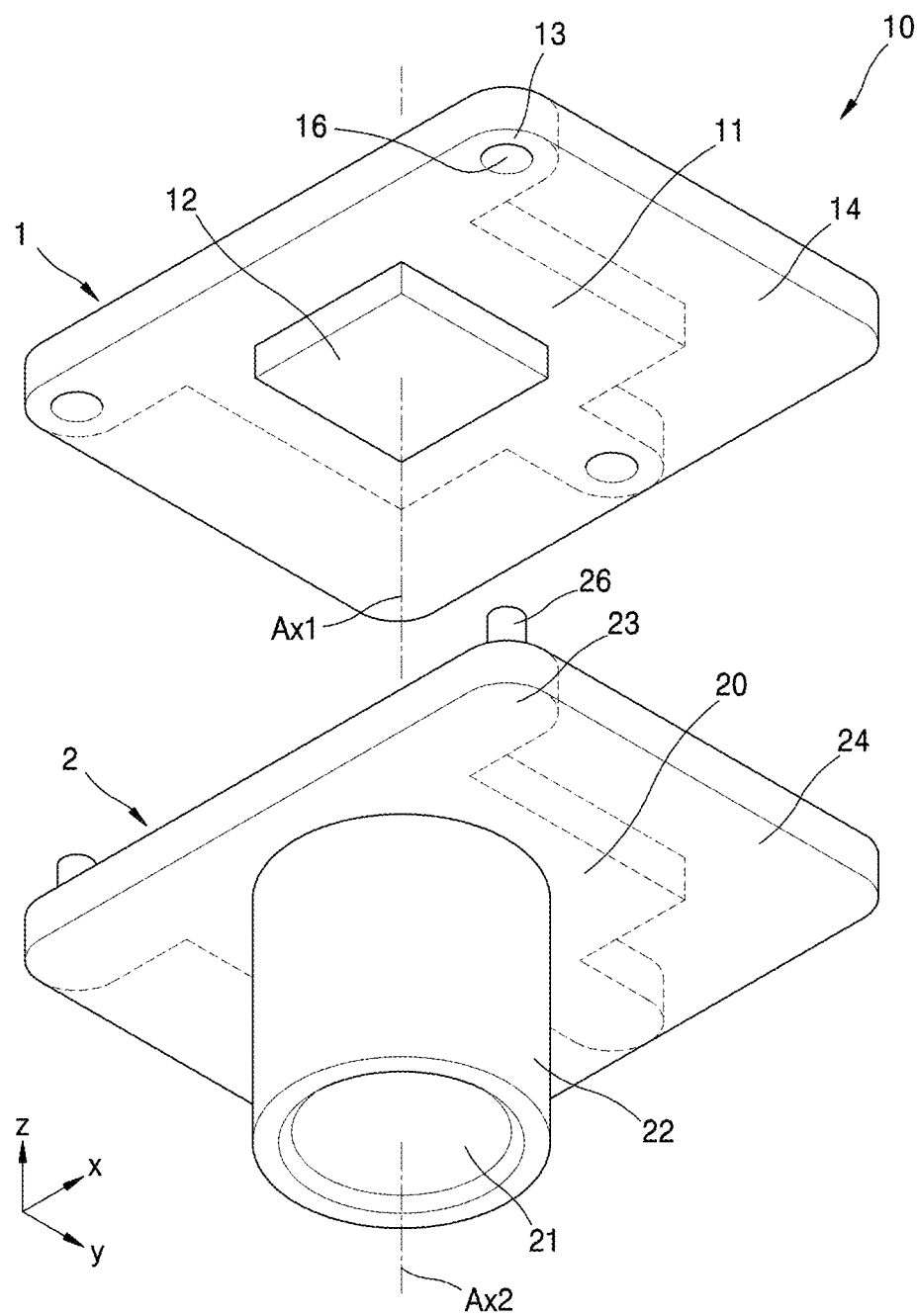
FIG. 12 is an exploded perspective view illustrating an example of a camera module to be assembled by a camera module manufacturing apparatus according to an embodiment of the present disclosure.

FIG. 12 is an exploded perspective view illustrating an example of a camera module to be assembled by a camera module manufacturing apparatus according to an embodiment of the present disclosure.

Referring to FIG. 12, in another embodiment of the camera module 10, like the embodiment illustrated in FIG. 6, the substrate assembly 1 may further include the first connection part 14 extending from the substrate 11 and located between neighboring first extension parts 13. The first connection part 14 may be formed to connect in between neighboring first extension parts 13, and may also be connected to the substrate 11 between neighboring first extension parts 13.

The first connection part 14 may be integrally formed with the PCB substrate 11 and/or the first extension part 13, and a conductive wire pattern electrically connected to the conductive wire pattern formed on the substrate 11 may be formed thereon, and at least one electronic device electrically connected to the conductive wire pattern may be mounted thereon. The substrate assembly 1 may include the first hole 16 formed in the first extension part 13, like in the embodiment illustrated in FIG. 8.

Due to the first connection part 14, the entire area of the PCB substrate 11 connected to the image sensor 12 may be further enlarged, and accordingly, the degree of freedom in designing the conductive wire pattern may be increased. In addition, due to the formation of a rectangular planar structure as a whole by the assembly structure of the first connection part 14 and the substrate 11, when the camera module 10 is mounted on another apparatus, compatibility thereof with other apparatuses can be improved.

As illustrated in FIG. 6, the substrate assembly 1 may include two first connection parts 14 to connect neighboring first extension parts 13, but the present disclosure is not limited thereto, and any structure according to the design conditions of the substrate assembly 1 may be provided.

Like the embodiment illustrated in FIG. 8, the lens assembly 2 may include the actuator 22 and the lens 21. The actuator 22 is provided on the support 20, and may include a plurality of second extension parts 23 extending from the support 20 in a direction crossing the second optical axis Ax2 of the lens 21. The embodiment illustrated in FIG. 12 may further include, in addition to the second extension parts 23, a second connection part 24 extending from the support 20 and positioned between neighboring second extension parts 23. The second connection part 24 is formed to connect in between neighboring second extension parts 23, and may also be connected to the substrate 20 between neighboring second extension parts 23.

The second connection part 24 may be integrally formed with the support 20 and/or the second extension part 23, and optionally a conductive wire pattern electrically connected to the conductive wire pattern formed on the support 20 may be formed thereon. Like the embodiment illustrated in FIG. 2, the lens assembly 2 may include a second hole 25 formed in the second extension part 23.

Due to the second connection part 24, the total area of the support 20 is further enlarged, and accordingly, the degree of freedom in design can be increased. In addition, due to the formation of a rectangular planar structure as a whole by the assembly structure of the first connection part 14 and the PCB substrate 11, when the camera module 10 is mounted on another apparatus, compatibility thereof with other apparatuses can be improved.

As illustrated in FIG. 12, the lens assembly 2 may include two second connection parts 24 to connect neighboring second extension parts 23, but the present disclosure is not limited thereto, and any structure according to the design conditions of the lens assembly 2 may be provided.

In an embodiment of the present disclosure, the camera module manufacturing apparatus 100 may calculate the internal variables of the camera module based on the image taken by the chart unit 111, and using the obtained values, optical-axis alignment and tilt alignment may be performed simultaneously.

Figure 13:
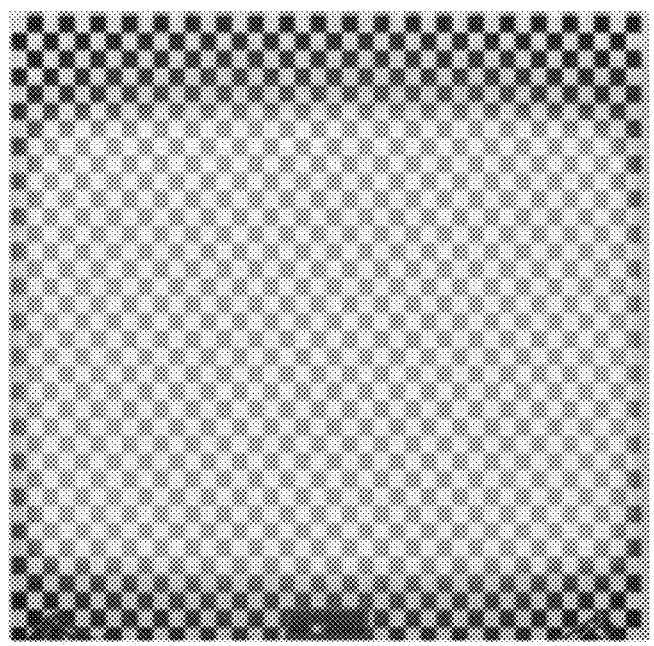
FIG. 13 shows a diagram illustrating an example of an inspection chart pattern of a chart unit.

FIG. 13 shows a diagram illustrating an example of an inspection chart pattern of a chart unit. A lattice point of an image is extracted by photographing a pattern of a chess bar pattern as shown in FIG. 13 through the image sensor 12. Based on this extracted lattice point pattern, the internal variables of the camera module may be calculated.

Figure 14:
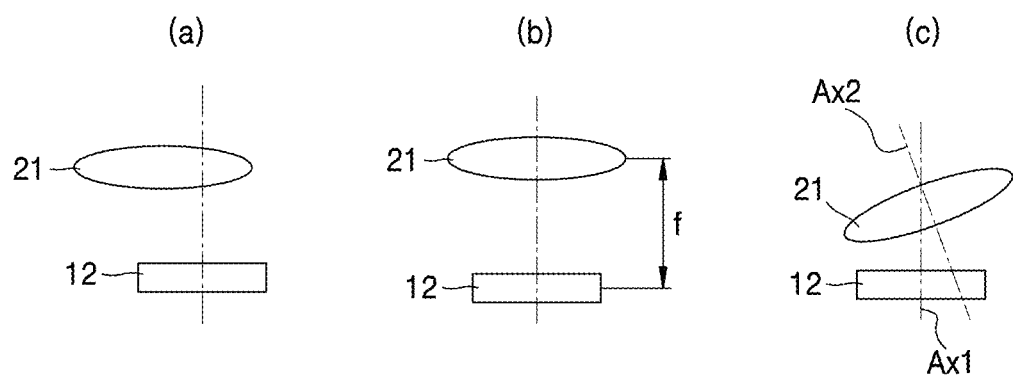
FIG. 14 shows a diagram illustrating an example of internal variables of a camera module.

The internal variables of the camera module may include a principal point, a focal length, and a center of distortion. FIG. 14 shows a diagram illustrating an example of internal variables of a camera module.

As seen in (a) of FIG. 14, the principal point indicates the degree to which the optical axis of the lens 21 and the optical axis of the image sensor 12 are misaligned. From this principal point, the movement distance of the lens 21 and/or the image sensor 12 may be calculated to achieve optical-axis alignment.

As can be seen from (b) of FIG. 14, the best position, at which the maximum resolution can be obtained, may be selected by adjusting the focal distance f between the lens 21 and the image sensor 12.

As illustrated in (c) of FIG. 14, by calculating the center of distortion by sensing the center of the second optical axis Ax2 of the lens 21 recognized by the image sensor 12, the degree of misalignment of the first optical axis Ax1 of the image sensor 12 with respect to the second optical axis Ax2 of the lens 21 may be calculated. Based on the result, the degree of tilt between the image sensor 12 and the lens 21 may be calculated, and accordingly, tilt alignment may be achieved.

As such, the control unit of the present disclosure calculates the principal point, the focal distance and/or center of distortion based on the sensed image as described above, and may achieve optical-axis alignment, resolution adjustment, and/or tilt alignment based on the calculation results, and may operate the driving unit 124.

These embodiments of the present disclosure described above may also be applied in combinations. In camera module manufacturing apparatuses according to embodiments of the present disclosure, the optical axis distortion of a camera module can be minimized by using an instantaneous curing adhesive, that is, an adhesive including solder, which provides a fixing force instantly. In addition, in the case of camera module manufacturing apparatuses according to embodiments of the present disclosure can apply an instantaneous curing adhesive in a direction from a lens assembly to a substrate assembly, thereby enabling a chart unit to be provided above the camera module. Accordingly, the camera module manufacturing apparatuses according to embodiments of the present disclosure can be directly applied without changing the structure of existing equipment.

Hereinbefore, the present disclosure has been described based on embodiments. Those of ordinary skill in the art to which the present disclosure pertains will understand that the present disclosure may be implemented in a modified form without departing from the essential characteristics of the present disclosure. Therefore, the disclosed embodiments should be considered from an illustrative point of view rather than a limiting point of view. The scope of the present disclosure is shown in the claims rather than the above description, and all differences within the scope should be construed as being included in the disclosure.

What is claimed is:

1. A camera module manufacturing apparatus comprising:
a chart unit configured to provide an image for optical-axis alignment to a substrate assembly including an image sensor;
a substrate alignment unit disposed opposite to the chart unit, aligning the substrate assembly, and electrically connected to the image sensor;
an optical axis alignment unit configured to allow an optical axis of a lens assembly including a lens and an actuator to be aligned with respect to an optical axis of the image sensor; and
a camera module fixing unit positioned adjacent to the optical axis alignment unit, and fixing the lens assembly on the substrate assembly by applying an instantaneous curing adhesive, which is an inorganic material, to the lens assembly and the substrate assembly which are aligned, wherein
the substrate assembly comprises a first extension part extending in a direction crossing the optical axis thereof, and the lens assembly comprises a second extension part formed to correspond to the first extension part,
one of the first extension part and the second extension part comprises a fixing part protruding from a surface thereof, and the other one that does not comprise the fixing part comprises a hole for receiving the fixing part, and
the camera module fixing unit applies the instantaneous curing adhesive between the hole and the fixing part in a state in which the hole receives the fixing part, to fix the lens assembly and the substrate assembly.

2. The camera module manufacturing apparatus of claim 1, wherein
the fixing part is formed on the second extension part, and the hole is formed in the first extension part.

3. The camera module manufacturing apparatus of claim 1, wherein
the camera module fixing unit applies the instantaneous curing adhesive in a direction from the substrate assembly toward the lens assembly to fix the substrate assembly on the lens assembly.

4. The camera module manufacturing apparatus of claim 1, wherein
the instantaneous curing adhesive comprises a solder.

5. The camera module manufacturing apparatus of claim 1, wherein
the first extension part and the second extension part are each provided as a plurality of extension parts,
the substrate assembly further comprises at least a first connection part positioned between neighboring first extension parts and connecting the same to each other, and
the lens assembly further comprises at least a second connection part positioned between neighboring second extension parts and connecting the same to each other.

6. The camera module manufacturing apparatus of claim 5, wherein
the first extension part and the first connection part are integrally formed, and
the second extension part and the second connection part are integrally formed.

7. A camera module comprising:
a substrate assembly comprising an image sensor and having a first extension part extending in a direction crossing an optical axis of the image sensor;
a lens assembly comprising a lens and an actuator and having a second extension part formed to correspond to the first extension part; and
an instantaneous curing adhesive for fixing the lens assembly and the substrate assembly to each other, wherein
one of the first extension part and the second extension part comprises a fixing part protruding from a surface thereof, and the other one that does not comprise the fixing part comprises a hole for receiving the fixing part, and
the instantaneous curing adhesive is applied between the hole and the fixing part in a state in which the hole receives the fixing part, and
the hole passes through the first extension part or the second extension part.

8. The camera module of claim 7, wherein
the fixing part is formed on the second extension part, and the hole is formed in the first extension part.

9. The camera module of claim 7, wherein
the instantaneous curing adhesive is applied in a direction from the substrate assembly toward the lens assembly to fix the substrate assembly on the lens assembly.

10. The camera module of claim 7, wherein
the instantaneous curing adhesive comprises a solder.

11. The camera module of claim 7, wherein
the first extension part and the second extension part are each provided as a plurality of extension parts,
the substrate assembly further comprises at least a first connection part positioned between neighboring first extension parts and connecting the same to each other, and
the lens assembly further comprises at least a second connection part positioned between neighboring second extension parts and connecting the same to each other.

12. The camera module of claim 11, wherein
the first extension part and the first connection part are integrally formed, and
the second extension part and the second connection part are integrally formed.

13. A camera module manufacturing method comprising:
providing an image for optical-axis alignment to a substrate assembly comprising an image sensor;

allowing an optical axis of a lens assembly comprising a lens and an actuator to be aligned with respect to an optical axis of the image sensor; and fixing the lens assembly on the substrate assembly by applying an instantaneous curing adhesive, which is an inorganic material, to the lens assembly and the substrate assembly which are aligned, wherein the substrate assembly comprises a first extension part extending in a direction crossing the optical axis thereof, and the lens assembly comprises a second extension part formed to correspond to the first extension part, one of the first extension part and the second extension part comprises a fixing part protruding from a surface thereof, and the other one that does not include the fixing part comprises a hole for receiving the fixing part, and in the fixing of the lens assembly on the substrate assembly, the instantaneous curing adhesive is applied between the hole and the fixing part in a state in which the hole receives the fixing part to fix the lens assembly and the substrate assembly.

14. The camera module manufacturing method of claim 13, wherein the fixing part is formed on the first extension part, and the hole is formed in the second extension part.

15. The camera module manufacturing method of claim 13, wherein the fixing part is formed on the second extension part, and the hole is formed in the first extension part.

16. The camera module manufacturing method of claim 13, wherein in the fixing of the lens assembly on the substrate assembly, the instantaneous curing adhesive is applied in a direction from the lens assembly toward the substrate assembly to fix the lens assembly on the substrate assembly.

17. The camera module manufacturing method of claim 13, wherein in the fixing of the lens assembly on the substrate assembly, the instantaneous curing adhesive is applied in a direction from the substrate assembly toward the lens assembly to fix the substrate assembly on the lens assembly.

18. The camera module manufacturing method of claim 13, wherein the instantaneous curing adhesive includes a solder.

19. The camera module manufacturing method of claim 13, wherein the first extension part and the second extension part are each provided as a plurality of extension parts, the substrate assembly further comprises at least a first connection part positioned between neighboring first extension parts and connecting the same to each other, and the lens assembly further comprises at least a second connection part positioned between neighboring second extension parts and connecting the same to each other.

20. The camera module manufacturing method of claim 19, wherein the first extension part and the first connection part are integrally formed, and the second extension part and the second connection part are integrally formed.

* * * * *